United States Patent
Dunaevsky et al.

(10) Patent No.: US 7,140,291 B2
(45) Date of Patent: Nov. 28, 2006

(54) OIL-FREE/OIL-LESS AIR COMPRESSOR WITH AN IMPROVED SEAL

(75) Inventors: Valery Dunaevsky, Fairview Park, OH (US); Gene Gilbert, Elyria, OH (US)

(73) Assignee: Bendix Commercial Vehicle Systems LLC, Elyria, OH (US)

( * ) Notice: Subject to any disclaimer, the term of this patent is extended or adjusted under 35 U.S.C. 154(b) by 0 days.

(21) Appl. No.: 11/045,238

(22) Filed: Jan. 28, 2005

(65) Prior Publication Data

US 2006/0169134 A1   Aug. 3, 2006

(51) Int. Cl.
*F16J 9/20* (2006.01)
*F16J 9/28* (2006.01)

(52) U.S. Cl. .......................... 92/253; 92/248; 277/436; 277/438

(58) Field of Classification Search .................. 92/248, 92/249, 253; 277/436, 437, 438, 493
See application file for complete search history.

(56) References Cited

U.S. PATENT DOCUMENTS

| | | | | |
|---|---|---|---|---|
| 2,419,192 A | * | 4/1947 | Anderson | 92/249 |
| 2,893,799 A | * | 7/1959 | Marien | 277/481 |
| 3,389,973 A | * | 6/1968 | Fitzpatrick | 422/226 |
| 3,462,333 A | | 8/1969 | McCormick et al. | |
| 3,503,823 A | | 3/1970 | Richart et al. | |
| 3,656,414 A | * | 4/1972 | Muller | 92/249 |
| 3,658,350 A | | 4/1972 | Ondraka | |
| 3,751,047 A | | 8/1973 | McGee | |
| 3,765,560 A | * | 10/1973 | Kemp | 138/90 |
| 3,855,073 A | * | 12/1974 | Kucharzyk | 202/262 |
| 4,132,420 A | | 1/1979 | Lundholm | |
| 4,206,930 A | | 6/1980 | Thrane et al. | |
| 4,244,192 A | * | 1/1981 | Chellis | 277/438 |
| 4,552,233 A | | 11/1985 | Klima | |
| 4,576,381 A | | 3/1986 | Slack | |
| 4,629,200 A | * | 12/1986 | Ruddy | 277/463 |
| 5,003,940 A | * | 4/1991 | Hixson | 123/90.54 |
| 5,198,053 A | | 3/1993 | Duncan | |
| 5,743,707 A | | 4/1998 | Battig et al. | |
| 6,113,367 A | | 9/2000 | Dunaevsky et al. | |
| 6,205,908 B1 | | 3/2001 | Kumai et al. | |
| 6,361,830 B1 | | 3/2002 | Schenk et al. | |
| 6,428,014 B1 | * | 8/2002 | Scarlett | 277/435 |
| 6,485,027 B1 | | 11/2002 | Carrie et al. | |
| 6,502,826 B1 | * | 1/2003 | Schroeder et al. | 277/468 |
| 6,668,703 B1 | * | 12/2003 | Gamble | 92/186 |
| 6,726,220 B1 | | 4/2004 | Grimanis et al. | |
| 2004/0119242 A1 | | 6/2004 | Katumaru et al. | |

OTHER PUBLICATIONS

Article "Sealing and guiding elements for compressors Oil-free—The environment challenge to industry" from website www.elringklinger-kunstsoff.de.

(Continued)

*Primary Examiner*—Edward K. Look
*Assistant Examiner*—Michael Leslie
(74) *Attorney, Agent, or Firm*—Eugene E. Clair

(57) ABSTRACT

An oil-free/oil-less air compressor with a piston positioned for reciprocating in a bore, the piston having a first piston ring assembly made from a rigid, high temperature polymer, and a second piston ring assembly comprising a first portion that engages the bore, the first portion made from a relatively soft, self-lubricating polymer, and a second portion that biases the first portion against the bore.

14 Claims, 3 Drawing Sheets

OTHER PUBLICATIONS

Article "Elring PTFE Properties and applications of an exceptional material" from website www.elringklinger-kunstsoff.de.

Article "Elring Spring Energised Seals Compact—universal—predictable" from website www.elringklinger-kunstsoff.de.

Article "Compound Know-how Leads to Innovative Solutions" from website www.elringklinger-kunstsoff.de.

Article "Piston and Rod Seals Spring-energized Seal Details" from website www.elringklinger-kunstsoff.de.

Article "Spring-energized Seal Types" from website www.elringklinger-kunstsoff.de.

* cited by examiner

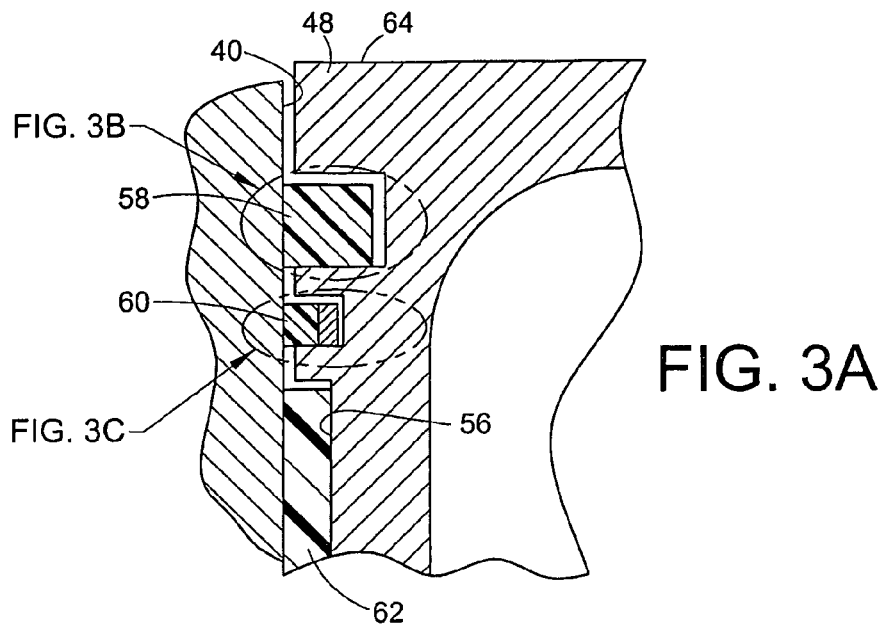
FIG. 3A
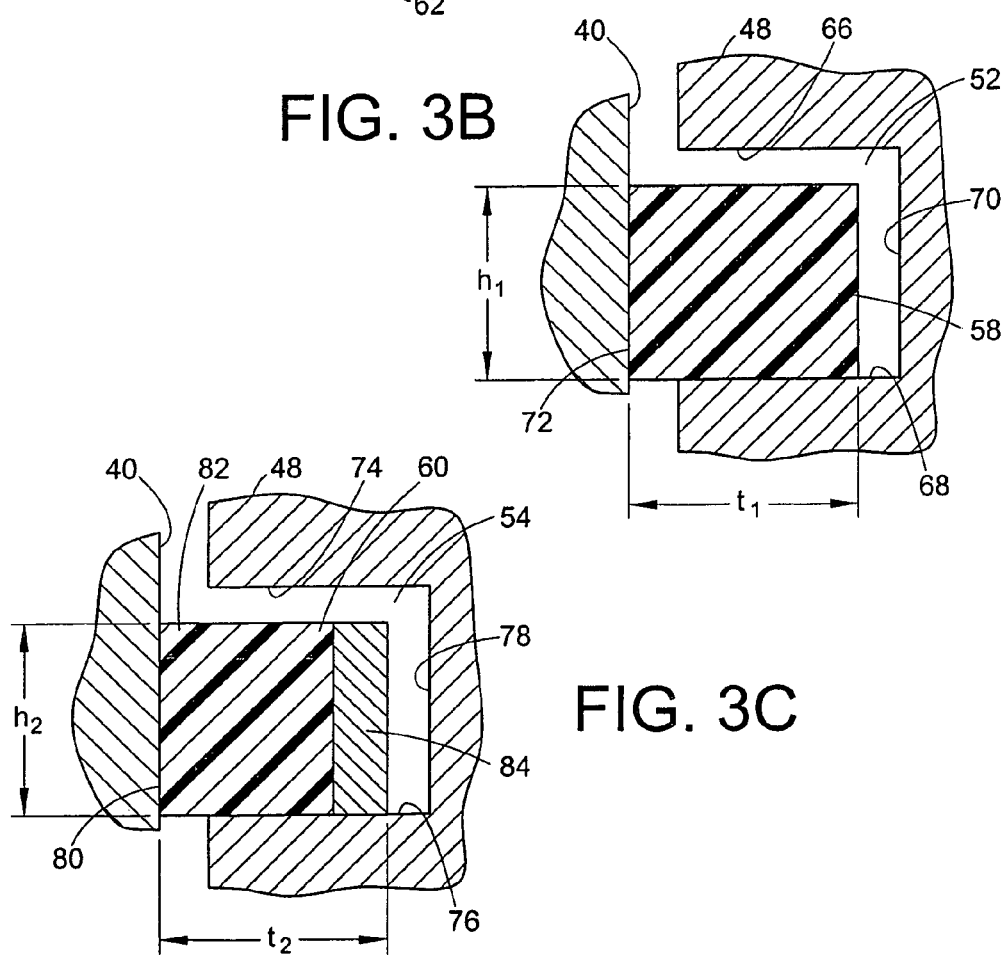
FIG. 3B
FIG. 3C

OIL-FREE/OIL-LESS AIR COMPRESSOR WITH AN IMPROVED SEAL

BACKGROUND OF INVENTION

The present invention relates to oil-free/oil-less air compressors. It finds particular application in conjunction with oil-free/oil-less air compressors with a piston ring set designed for improved sealing between a piston and cylinder bore. It will be appreciated, however, that the invention is also amenable to other applications.

Oil-free/oil-less air compressors are known in the art and generally refer to the family of air compressors that do not use oil to lubricate the piston-cylinder bore region, instead relying on the self-lubricating nature of the ring material for lubrication. FIG. 1 illustrates a cross-sectional side view of a section of a piston 10 and cylinder bore wall 12 of a conventional oil-free/oil-less air compressor. Generally, oil-free/oil-less air compressors employ a piston 10 having a crown 14, a top annular recess 16, and a rider ring annular recess 18. The top annular recess 16 receives a compression ring 20 for sealing between the piston 10 and the cylinder bore wall 12. The rider ring annular recess 18 receives a rider ring 22 for preventing contact between the piston and the cylinder wall 12 in order to avoid resulting damage to these parts. The rider ring 22 does not typically provide any sealing between the piston 10 and the cylinder bore wall 12.

Piston rings for oil-free/oil-less air compressors are typically manufactured from round sintered tubes made of relatively soft, conformable polymeric materials such as polytetrafluoroethylene (PTFE) based materials. Conventional PTFE rings, however, lack sufficient internal tension to conform the ring to distortions in a cylinder bore. Further, high operating temperatures can result in conventional PTFE rings losing what tension they have and high run-in wear on the soft polymeric rings can preclude the rings from effectively sealing. To improve sealing, some oil-free/oil-less air compressor pistons employ multiple PTFE compression rings or use rigid, high temperature polymer piston rings. Rigid polymer rings, however, do not conform well to bore distortions due to their rigidity.

SUMMARY OF INVENTION

In one aspect of the present invention, it is contemplated to provide an improved sealing piston ring set for an oil-free/oil-less air compressor.

In accordance with one embodiment of the present invention, an oil-free/oil-less air compressor includes a piston positioned for reciprocating in a bore. The piston has a first piston ring assembly made from a rigid, self-lubricating polymer. The piston also has a second piston ring assembly which has a first portion that engages the bore wall. The first portion is made from a relatively soft, self-lubricating polymer. A second portion of the piston ring assembly biases the first portion against the bore wall.

In accordance with another embodiment of the present invention, an oil-free/oil-less air compressor includes a piston positioned for reciprocating in a bore. The piston has a piston ring assembly comprising a first portion that engages the bore wall. The first portion is made from a relatively soft, self-lubricating polymer. A second portion of the piston ring assembly biases the first portion against the bore wall. The second portion is bonded to the first portion.

The present invention also relates to a method for sealing between a piston and a cylinder bore of an oil-less/oil-free air compressor.

BRIEF DESCRIPTION OF DRAWINGS

In the accompanying drawings which are incorporated in and constitute a part of the specification, embodiments of the invention are illustrated, which together with a general description of the invention given above, and the detailed description given below, serve to exemplify the embodiments of this invention, wherein:

FIG. 3A illustrates a cross-sectional side view of a piston of the exemplary air compressor of FIG. 2 with the piston ring assemblies positioned in the annular recesses on the piston;

FIG. 3B illustrates an enlarged cross-sectional side view of a first piston ring assembly of the exemplary air compressor of FIG. 2 with the first piston ring assembly positioned in a first annular recess of the piston;

FIG. 3C illustrates an enlarged cross-sectional side view of a second piston ring assembly of the exemplary air compressor of FIG. 2 with the second piston ring assembly positioned in a second annular recess of the piston;

DETAILED DESCRIPTION OF DRAWINGS

The present invention generally relates to an oil-free/oil-less air compressor. In particular, the present invention relates to an oil-free/oil-less air compressor having a piston ring set for improved sealing between the piston and cylinder bore.

Figure 2:
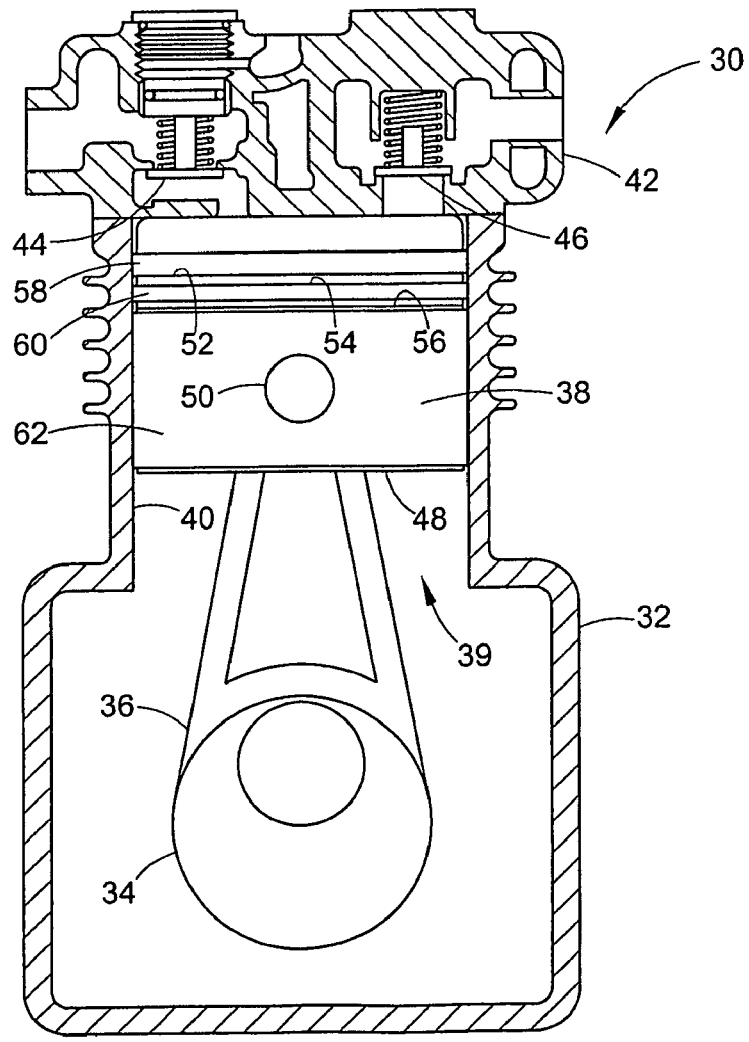
FIG. 2 illustrates a cross-sectional side view of a first exemplary air compressor according to the present invention.

As representative of the present invention, FIG. 2 illustrates a cross-sectional side view of an exemplary oil-free/oil-less air compressor 30 in accordance with a first exemplary embodiment of the present invention. Generally, an oil-free/oil-less air compressor 30, as known in the art, includes a crankcase 32 housing a rotatably-mounted crankshaft 34. A power source, typically an engine or motor (not shown), drives the crankshaft 34.

The crankcase 32 also includes a connecting rod 36 that operatively connects the crankshaft 34 to a piston assembly 38. The piston assembly 38 resides within a cylindrical bore 39 having a cylinder bore wall 40 and reciprocates within the bore 39 as the crankshaft 34 rotates. A cylinder head 42 closes the cylinder bore 39 on one end. The cylinder head 42 typically includes an inlet valve 44 and a discharge valve 46 for allowing air to enter and exit the cylinder bore 39, respectively. The inlet valve 44 and the discharge valve 46, however, do not need to be within the cylinder head 42. For example, conventional oil-free/oil-less air compressors are also known in the art to position the inlet valve 44 in the crankcase 32 as opposed to in the cylinder head 42.

The piston assembly 38 includes a wrist pin 50 rotatably connecting a piston 48 to the connecting rod 36. The piston 48 includes a plurality of annular recesses 52, 54, 56 that receive corresponding piston ring assemblies 58, 60 and a rider portion 62, respectively. The embodiments in FIGS. 1–5 are described with three annular recesses 52, 54, 56. Those of ordinary skill in the art, however, will appreciate that fewer or additional annular recesses with corresponding piston ring assemblies positioned therein can be employed on the piston 48.

FIGS. 3A–C illustrate cross-sectional side views of the piston 48 of the exemplary air compressor 30 of FIG. 2 with the piston rings 58, 60 and a rider portion 62 positioned in the annular recesses 52, 54, 56 of the piston 48, respectively. The piston 48 of the exemplary air compressor may include a crown 64, a first annular recess 52, a second annular recess 54 and a rider portion annular recess 56. The second annular recess 54 is axially more distant from the crown 64 than the first annular recess 52, while the rider portion annular recess 56 is axially more distant from the crown that the second annular recess 54.

The piston 48 of the exemplary embodiment of FIGS. 3A–C may, but not necessarily, include a rider portion 62 received in the rider portion annular recess 56. It is well known in the art for an oil-less/oil-free air compressor piston to include a rider portion 62. A rider portion 62, however, is not critical to the present invention and is described below as is generally known in the art. The rider portion 62 may be a discontinuous ring with a substantially rectangular cross section that extends axially along the piston 48, as illustrated in FIG. 3A. Typically, the rider portion is made from a low-friction material, such as a PTFE-based material. Those skilled in the art, however, will appreciate that the rider portion 62 may be continuous (i.e. contain no gap) and/or may have a cross-sectional shape other than rectangular. For example, a rider portion that includes a shoulder section is known in the art. Further, the rider portion may be configured without use of a rider portion annular recess. For example, a gapless sheath coated with a PTFE based material that fits over a region of the piston is known in the art. Further, the rider portion may consist of a low-friction coating, such as PTFE, that is applied to the piston and acts as a barrier between the cylinder bore wall and the piston.

The first annular recess 52 of the first exemplary embodiment of the present invention receives a first piston ring assembly 58. The first annular recess 52 has a generally rectangular cross section with a top surface 66, a bottom surface 68, and an inner surface 70. Likewise, the first piston ring assembly 58 has a generally rectangular cross-section with a bore interface portion 72 that engages the cylinder bore wall 40, an axial thickness $h_1$, and a radial thickness $t_1$. Those skilled in the art will appreciate that the first annual recess 52 and the first piston ring assembly 58 may have cross-sectional shapes other than rectangular. For example, it is known in the art to have a keystone-shaped ring and recess for use in some applications. Further, it is known in the art to chamfer an inner corner on the piston ring assembly to affect the manner in which the piston ring assembly engages the cylinder bore wall 40.

The first piston ring assembly 58, in cooperation with the first annular recess 52 and cylinder bore wall 40, acts as a seal, allowing the piston 48 to compress the air trapped between the piston 48 and the cylinder head 42 (see FIG. 2). As shown in FIG. 3, the axial thickness $h_1$ of the first piston ring assembly 58 is less than the axial distance between the top surface 66 and the bottom surface 68 of the first annular recess 52. Further, the radial thickness $t_1$ of the first piston ring assembly 58 is less than the radial distance between the cylinder bore wall 40 and the inner surface 70 of the first annular recess 52. Those skilled in the art will appreciate that the scale of the distances depicted in FIGS. 3A–C and FIGS. 5A–B, which are discussed in more detail below, are exaggerated for illustrative purposes.

Figure 1:
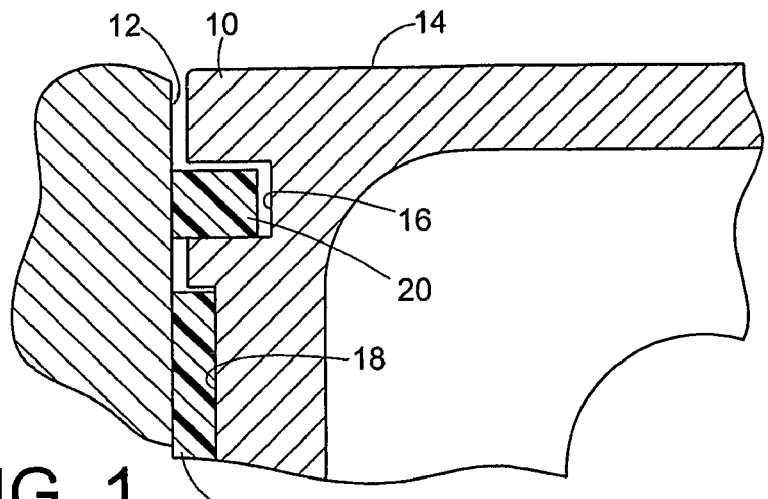
FIG. 1 illustrates a cross-sectional side view of a piston of a prior art air compressor showing piston ring assemblies positioned in the annular recesses of the piston.

As described with relation to FIG. 1, the top compression ring 20 in a conventional oil-free/oil-less air compressor is typically made from a PTFE based material. In contrast, with reference to FIG. 2, the first piston ring assembly 58 of the first exemplary air compressor 30 according to the present invention is made from a rigid, high temperature polymer. Examples of a suitable polymer for the first piston ring assembly 58 include a polyimide, polyamide, polyester, polyetheretherketone, polyamideimide, polyetherimide, polyphenylene sulfide, and polybenzimidazole. The first piston ring assembly 58 of a first exemplary embodiment according to the present invention is preferably manufactured by injection molding. Conventional injection molding processes may be used to form the piston ring assembly 58, however, other manufacturing processes, such as machining, may alternatively be used.

The first piston ring assembly 58 utilizes gas pressure developed during compressor operation and the internal tension in the first piston ring assembly 58 to help create a seal between the piston 48 and the cylinder bore wall 40. The profile and internal tension in a piston ring assembly is described in detail below regarding the second piston ring assembly 60 of FIG. 4 but is equally applicable to first piston ring assembly 58.

The second annular recess 54 of piston 48 receives a second piston ring assembly 60. The second annular recess 54 has a generally rectangular cross section with a top surface 74, a bottom surface 76, and an inner surface 78. Likewise, the second piston ring assembly 60 has a generally rectangular cross-section with a bore interface portion 80 that engages the cylinder bore wall 40, an axial thickness $h_2$, and a radial thickness $t_2$. Those skilled in the art will appreciate that the second annual recess 54 and the second piston ring assembly 60 may have cross-sectional shapes other than rectangular. For example, the second piston ring assembly 60 in the exemplary embodiments illustrated in FIGS. 5A and 5B, discussed in detail below, have non-rectangular cross-sections.

As discussed above regarding the first piston ring assembly 58, the second piston ring assembly 60 acts as a seal between the piston 48 and the cylinder bore wall 40. As with the first piston ring assembly 58, the axial thickness $h_2$ of the second piston ring assembly 60 is less than the axial distance between the top surface 74 and the bottom surface 76 of the second annular recess 54. Further, the radial thickness $t_2$ of the second piston ring assembly 60 is less than the radial distance between the cylinder bore wall 40 and the inner surface 78 of the second annular recess 54. In addition, because the second annular recess 54 is axially more distant from the crown 64 than the first annular recess 52, the second piston ring assembly 60 typically is exposed to less pressure and temperature than the first piston ring assembly 58. As a result, the axial thickness $h_2$ of the second piston ring assembly 60 may, but not necessarily, be less than that axial thickness $h_1$ of the first piston ring assembly 58.

The second piston ring assembly 60 includes a first portion 82 and a second portion 84. The first portion 82 includes a bore interface portion 80 that engages the cylinder bore wall 40. The bore interface portion 80, as illustrated in FIG. 3, may be substantially flat to conform to the cylinder bore wall 40. Those skilled in the art, however, will appreciate that the bore interface portion 80 can be a variety of configurations. For example, it is known in the art for the bore interface portion 80 to be barrel faced, tapered faced, or include multiple regions that engage the bore wall 40.

As compared to the rigid, high temperature polymer of the first piston ring assembly 58, the material of the first portion 82 of the second piston ring assembly 60 is a relatively soft, self-lubricating polymer. A relatively soft, self-lubricating polymer is more complaint and has a lower elastic modulus than the rigid, high temperature polymer of the first piston ring assembly 58. In addition, the material of the first portion 82 will retain its functional and structural properties and not adhere to the cylinder bore wall 40 at temperatures up to at least 600 degrees Fahrenheit. A PTFE based material is suitable and preferable for the first portion 82. As is known in the art, the PTFE based material can include fillers such as carbon and graphite to improve performance characteristics such as wear and thermal resistance. The first portion 82, however, can be made of any self-lubricated, relatively soft, low friction material with sufficient thermal and wear resistance for application in an oil-free/oil-less air compressor.

The second piston ring assembly 60 of the first exemplary air compressor 30 (see FIG. 2) also includes a second portion 84. The second portion 84 of the second piston ring assembly 60 may be substantially rectangular as shown in FIG. 3. Those skilled in the art, however, will appreciate that the second portion 84 may have a cross-sectional shape other than substantially rectangular. For example, the second portion 84 in the exemplary embodiments illustrated in FIGS. 5A and 5B, discussed in detail below, have a substantially circular cross-section and a substantially U-shaped cross-section, respectively. A variety of configurations for a biasing portion are known in the art and are equally applicable as a second portion of the present invention. For example, the second portion 84 can be a coil expander as described in U.S. Pat. No. 6,205,908.

The second portion 84 resides radially inward from at least a section of the first portion 82 and biases the first portion 82 against the cylinder bore wall 40. In the first exemplary embodiment, the second portion 84 may abut the first portion 82 and may preferably, but not necessarily, be bonded to the first portion 82. Those skilled in the art, however, will appreciate that the second portion 84 may be configured in a variety of ways and still be capable of biasing the first portion 82 against the cylinder bore wall 40. For example, the second portion 84 can be separate from the first portion 82, bonded or attached to the first portion 82, or incorporated in and surrounded by the first portion 82 (e.g. molded within the first portion).

The second portion 84 of the first exemplary embodiment of the present invention may be made from a metal such as cast iron or steel, and is preferably made from stainless steel. If the second portion is made from a metal, the first portion 82 and second portion 84 may be bonded by processes known in the art such as the process described in U.S. Pat. No. 5,198,053. Those of ordinary skill in the art will appreciate, however, that the second portion may be nonmetallic. For example, the second portion 84 may be made from a rigid polymer such as a polyimide as described in relation to the first piston ring assembly 58.

Figure 4:
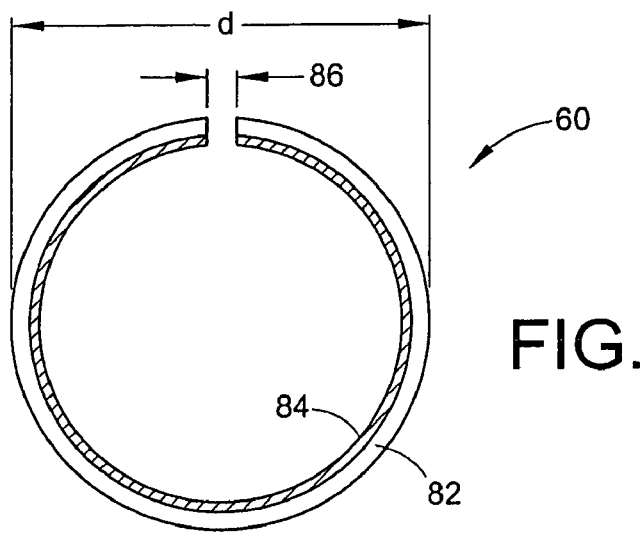
FIG. 4 illustrates a top view of the second piston ring assembly of the first exemplary air compressor of FIG. 2.

FIG. 4 illustrates an top view of the second piston ring assembly 60 of the first exemplary air compressor of FIG. 2. As shown in FIG. 4, the second piston ring assembly 60, as well as the first piston ring assembly 58, is annular but discontinuous. That is, the second piston ring assembly 60 includes a break or gap 86. FIG. 4 illustrates the second piston ring assembly 60 in the free state. The free state refers to the state where the second piston ring assembly 60 is not under a radial or tangential forces sufficient to deflect or compress it.

In the free state, the diameter d of the second piston ring assembly 60 is larger than the diameter of the cylinder bore wall 40. To position the second piston ring assembly 60 in the cylinder bore wall 40, the second piston ring assembly 60 is radially compressed. Due to the resilient nature of the material used for the second portion 84, radially compressing the second piston ring assembly 60 creates internal tension in the second portion 84 that resists compression. When the second piston ring assembly 60 resides in the cylinder bore wall 40, the internal tension in the second portion 84 biases the bore interface portion 80 of the first portion 82 against the cylinder bore wall 40.

The second piston ring assembly 60 is illustrated in FIG. 4 as having a substantially circular profile. The second piston ring assembly 60 and the first piston ring assembly 58, however, may have a predetermined noncircular profile in the free state. A predetermined non-circular profile can be designed to optimize the amount and distribution of pressure between the bore interface portion 80 and the cylinder bore wall 40 when the ring assemblies are installed. One of ordinary skill in the art will appreciate that alternative piston rings designs such as an overlapping ring as generally described in U.S. Pat. No. 4,206,930 and a spiral ring as generally described in U.S. Pat. No. 4,576,381 are discontinuous and the present invention is equally applicable to those and other ring designs.

The second piston ring assembly 60 can be made from a variety of processes. The second portion 84, for example may be cast or machined. Further, PTFE based material can be processed in numerous ways. For example, PTFE is suitable for powder coating applications. PTFE based material may also be compression molded or extruded. An example of a process for manufacturing the second piston ring assembly could include providing a sintered steel pipe or heat treated wire, bonding a PTFE based material to the pipe or wire by a process known in the art, and machining the bonded pipe or wire into piston ring assemblies.

Figure 5A:
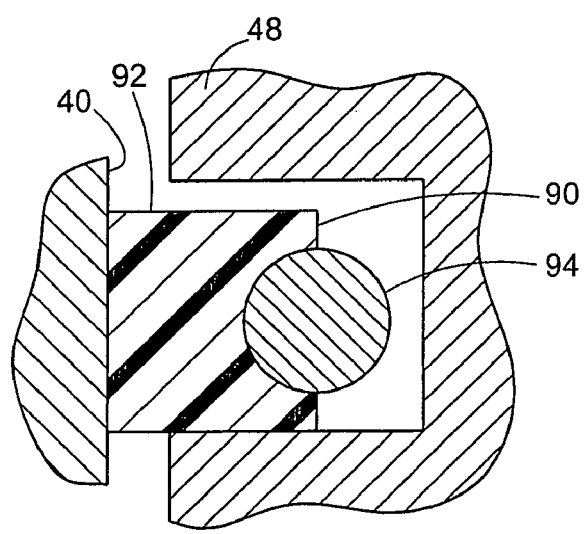
FIG. 5A illustrates a cross-sectional side view of a piston ring assembly of another exemplary air compressor according to a second embodiment of the present invention.

FIG. 5A illustrates a cross-sectional side view of a piston ring assembly of another exemplary air compressor according to a second embodiment of the present invention. The second piston ring assembly 90 of the second exemplary embodiment includes a first portion 92 and a second portion 94. The first portion 92 is substantially similar to the first portion 82 of the first exemplary embodiment of FIGS. 2–4. The second portion 94, however, has a substantially circular cross section. As with the second portion 84 of the first exemplary embodiment (see FIGS. 2–4), the second portion 94 of the second exemplary embodiment resides radially inward from at least a section of the first portion 92. The second portion 94 biases the first portion 92 against the bore wall 40, in a manner similar to the second portion 84 of the first exemplary embodiment biasing the first portion 82 against the cylinder bore wall 40 (see FIGS. 2–4).

Figure 5B:
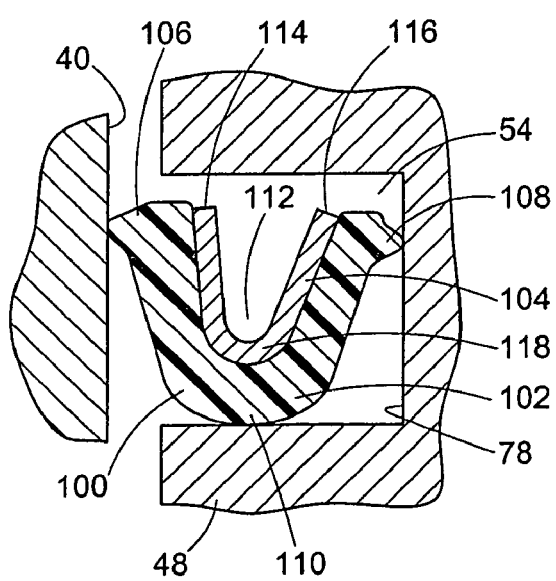
FIG. 5B illustrates a cross-sectional side view of a piston ring assembly of another exemplary air compressor according to a third embodiment the present invention.

FIG. 5B illustrates a cross-sectional side view of a piston ring assembly of another exemplary air compressor according to a third embodiment the present invention. The second piston ring assembly 100 of the third exemplary embodiment includes a first portion 102 and a second portion 104. The first portion 102 has a substantially U-shaped cross-section with a first sidewall 106, a second sidewall 108, and a bottom wall 110 that connects the first sidewall 106 and the second sidewall 108. The U-shaped configuration creates a cavity 112 adapted to receive the second portion 104.

The second portion 104 has a substantially U-shaped cross-section with a first sidewall 114, a second sidewall 116, and a bottom wall 118 that connects the first sidewall 114 and the second sidewall 116. At least a portion of the second portion 104 resides within the cavity 112 and acts on the first portion 102 to bias the first sidewall 106 against the cylinder bore wall 40 and the second side wall 108 against the inner surface 78.

The second portion 104 of the third exemplary embodiment according to the present invention may bias the first portion 102 against the cylinder bore wall 40 in a manner similar to the second portion 84 of the first exemplary embodiment biasing the first portion 82 against the cylinder bore wall 40 (see FIGS. 2–4). In addition, when the second piston ring assembly 100 resides in the second annular recess 54 and the piston 48 resides in the cylinder bore wall 40, the second piston ring assembly 100 may be compressed between the cylinder bore wall 40 and an inner surface 78 of the second annular recess 54. As a result, the first sidewall 114 of the second portion 104 is biased toward the second sidewall 116. Due to the resilient nature of the material used for the second portion 104, the second portion 104 resists compression and biases the first sidewall 106 of the first portion 102 against the cylinder bore wall 40.

While the present invention has been illustrated by the description of embodiments thereof, and while the embodiments have been described in considerable detail, it is not the intention of the applicants to restrict or in any way limit the scope of the appended claims to such detail. Additional advantages and modification will readily appear to those skilled in the art. Therefore, the invention, in its broader aspects, is not limited to the specific details, the representative apparatus, and illustrative examples shown and described. Accordingly, departures may be made from such details without departing from the spirit or scope of the applicant's general inventive concept.

We claim:

1. An oil-less/oil-free air compressor, comprising:
   a bore;
   a piston positioned for reciprocating in the bore, the piston having a crown, a first annular recess, and a second annular recess, wherein the second annular recess is more distant from the piston crown than the first annular recess;
   a first piston ring assembly received within the first annular recess, the first piston ring assembly made from a rigid, self-lubricating polymer; and
   a second piston ring assembly received within the second annular recess, the second piston ring assembly comprising:
   a first portion that engages the bore, the first portion including a soft, self-lubricating polymer, and
   a second portion that biases the first portion against the bore.

2. The oil-less/oil-free air compressor of claim 1 wherein the second portion is bonded to the first portion.

3. The oil-less/oil-free air compressor of claim 1 wherein the second portion has a substantially circular cross-section.

4. The oil-less/oil-free air brake compressor of claim 1 wherein the soft, self-lubricating polymer is a polytetrafluoroethylene based material and the rigid, self-lubricating polymer is one of polyimide, polyamide, polyester, polyetheretherketone, polyamideimide, polyetherimide, polyphenylene sulfide, and polybenzimidazole.

5. The oil-less/oil-free air compressor of claim 1 wherein the second portion is non-metallic.

6. The oil-less/oil-free air compressor of claim 1 wherein the second portion includes stainless steel.

7. An oil-less/oil-free air compressor, comprising:
   a bore;
   a piston positioned for reciprocating in the bore; and
   a crown on the piston;
   a rigid means for high temperature self lubricating sealing between the piston and the bore, the rigid means for sealing located proximate to the crown; and
   a soft means for self lubricating sealing between the piston and the bore, the soft means for sealing located further from the crown than the rigid means for sealing.

8. The oil-less/oil-free air compressor of claim 7 wherein the soft means for self lubricating sealing is discontinuous with a substantially U-shaped cross-section.

9. A sealing device between a bore and a piston of an air compressor, comprising:
   a first seal assembly residing in a first cooperating piston annular recess located proximate to a crown of an oil-free/oil-less air compressor piston, the first seal assembly made from a rigid, high temperature self-lubricating polymer, wherein the rigid, self-lubricating polymer is at least one of polyimide, polyamide, polyester, polyetheretherketone, polyamideimide, polyetherimide, polyphenylene sulfide, and polybenzimidazole; and
   a second seal assembly residing in a second cooperating piston annular recess of an oil-free/oil-less air compressor piston located further from the crown than the first piston recess, the second seal assembly comprising:
   a first portion that engages the bore, the first portion made of soft, self-lubricating polymer wherein the soft, self-lubricating polymer is a polytetrafluoroethylene material; and
   a second portion that biases the first portion against the bore.

10. The oil-less/oil-free air compressor of claim 9 wherein the second portion is bonded to the first portion.

11. The oil-less/oil-free air compressor of claim 9 wherein the second portion has a substantially circular cross-section.

12. The oil-less/oil-free air compressor of claim 9 wherein the second portion is non-metallic.

13. The oil-less/oil-free air compressor of claim 9 wherein the second portion includes stainless steel.

14. The oil-less/oil-free air compressor of claim 9 wherein the second seal assembly has a substantially U-shaped cross-section.

* * * * *